(12) United States Patent
Su

(10) Patent No.: US 6,631,097 B2
(45) Date of Patent: Oct. 7, 2003

(54) SONIC WATER LEVEL MEASURING METHOD AND SYSTEM THERE FOR

(75) Inventor: Tyan Khak Su, Ottawa (CA)

(73) Assignees: International Hydrosonic Co., Ltd., Seoul (KR); Hydrosonic International Co., Ltd., Ontario (CA)

(*) Notice: Subject to any disclaimer, the term of this patent is extended or adjusted under 35 U.S.C. 154(b) by 0 days.

(21) Appl. No.: 09/752,434

(22) Filed: Jan. 3, 2001

(65) Prior Publication Data

US 2002/0064090 A1 May 30, 2002

(30) Foreign Application Priority Data

Sep. 25, 2000 (KR) .......................... 2000-56273

(51) Int. Cl.[7] .............................................. G01F 23/296
(52) U.S. Cl. ...................................... 367/902; 367/908
(58) Field of Search .......................... 367/99, 908, 902; 73/290 V, 497; 340/621

(56) References Cited

U.S. PATENT DOCUMENTS

| 4,949,321 A | * | 8/1990 | Magori | ........................ | 367/902 |
| 4,964,104 A | * | 10/1990 | Capurka | ...................... | 367/902 |
| 5,062,295 A | * | 11/1991 | Shakkottai et al. | ......... | 367/908 |
| 5,842,373 A | * | 12/1998 | Stein et al. | .................... | 73/160 |
| 5,842,374 A |   | 12/1998 | Chang | ...................... | 73/290 V |

FOREIGN PATENT DOCUMENTS

| DE | 19511234 A1 | * | 12/1995 |
| JP | 406018316 A | * | 1/1994 |
| JP | 8166276 |   | 6/1996 |
| KR | 0150714 |   | 1/1996 |

* cited by examiner

*Primary Examiner*—Daniel T. Pihulic
(74) *Attorney, Agent, or Firm*—Lee & Sterba, P.C.

(57) ABSTRACT

A sonic water level measuring method and system for mounting a wave-guide tube for measuring a water level in a reservoir, a river, etc. generating sonic pulses at the upper of the wave-guide tube, measuring transit times that it takes for the sonic pulses to transit from an original point to a water surface through air medium and transit back to the original point after being reflected on the water surface and multiplying the transit times by a sound velocity to compute a water level is configured to measure the sound velocity using the times that it takes for the sonic pulse to transit in two intervals in order to exactly measure the sound velocity that is changed according to the changing of an air temperature, pressure and component in the wave-guide tube and then measure the water level considering an arithmetical average value of the sound velocities measured as a sound velocity in the wave-guide tube.

8 Claims, 9 Drawing Sheets

SONIC WATER LEVEL MEASURING METHOD AND SYSTEM THERE FOR

BACKGROUND OF THE INVENTION

The invention is related to a technology for measuring a water level using a sonic wave, and particularly, to a method for exactly measuring a water level using a sonic wave independent of a measuring range in a reservoir, a underground water and a larger river, etc., and system therefore.

PRIOR ART

A measuring range of a reservoir, a river and a underground water may be larger, but the hydrology observation requires not to exceed the allowance error±5 1~10 mm throughout a full range of a water level to be measured.

Typical sonic level measuring methods and/or systems therefore for satisfying such conditions are disclosed as follows:

U.S. Pat. No. 5,842,374 issued on Dec. 1, 1998

Germany Patent No. 19511234 published on Sep. 11, 1997

Japanese Patent No. 2,756,647 issued on Mar. 13, 1998

Korean Patent No. 150,714 issued on Jun. 16, 1998

A conventional sonic water level measuring method will be described with reference to FIG. 1. 1 is a sound generator, 2 is a wave-guide tube and $5_1, 5_2, 5_3 \ldots 5_n$ are a sound receiver.

The first sound receiver $5_1$ is placed on an original position 0, and a distance L to a water surface therefrom is measured.

The sound generator 1 is operated to transit a sonic pulse toward a water surface along the wage-guide tube 2. Then, the sonic pulse is reflected on the water surface and transited upward. At that time, a time interval $t_1$ from a moment that the sound receiver $5_1$ receives an incident wave until it receives the sonic pulse reflected on the water surface is as follows: (the measuring error of $t_1$ is ignored.)

$$t_1 = \frac{2L}{C_1} \quad (1)$$

Wherein, $C_1$ is a sonic velocity in an interval L.

Similarly, a time interval $t_2$ from a moment that the sound receiver $5_1$ receives an incident wave until the sound receiver $5_n$ receives the incident wave transited thereto is as follows:

$$t_2 = \frac{L_0}{C_2} = \frac{(h-1)l}{C_2} \quad (2)$$

Wherein, $C_2$ is a sonic velocity in an interval $L_0$, n is the number of the sound receiver and l is an interval between the sound receivers $5_i$ and $5_{i+1}$.

Therefore, L is obtained from the expressions (1) and (2) as follows:

$$L' = \frac{t_1}{2t_2} \cdot L_0 = \frac{t_1}{2t_2}(n-1)l \quad (3)$$

But, the exact value of L is as follows:

$$L = \frac{t_1}{2t_1} L_0 \frac{C_2}{C_1} \quad (4)$$

Wherein, the expression (3) is established under the assumption that $C_1 = C_2$.

In summer, an air temperature in the upper portion of the wave-guide tube is higher than that in the lower portion of the wave-guide tube. On the contrary, when the air temperature is lower than a water one, the air temperature in the upper portion of the wave-guide tube becomes lower than that in the lower portion of the wave-guide tube. Therefore, for $C_1 = C_2$, $L \approx L_0$ must be established.

In other words, the interval l between the sound receivers is selected to become as small as possible, and an interval $\Delta L = L_i - L_{0i}$ of the sound receiver disposed closest to the water surface in the wave-guide tube is selected. In the conventional sonic water level measuring system, the value l is selected as follows:

$$l \leq \Delta_L \frac{C_0 + 0.5\alpha(T_0 + T_w)}{0.5\alpha(T_0 - T_w)} \quad (5)$$

Wherein, $T_0$ is an air temperature in the position of the sound receiver $5_1$; $T_W$ is an air temperature on the water surface of the wave-guide tube; $C_0$ is a sonic velocity of 331.6 m/s, when T=0° C.; α is a temperature coefficient, in which α≈0.6; and $\Delta_L$ is an allowance error of the L measurement.

The expression (5) is derived under the assumption that the air temperature is changed with a constant gradient $(T_0 - T_L)/L$ of a straight line (referring to FIG. 5).

When $T_0 = 40°$ C., $T_W = 25°$ C. and $\Delta_L = 0.01$ m(1 cm), l is as follows:

$$l \leq 0.78 \text{ m}$$

If the water level is changed in the range of 20 m, the number of the receiver $5_i$ is as follows:

$$n \geq \frac{20}{0.78} = 25.6 \approx 26$$

If the allowance error of the water level measurement $\Delta_L = \pm 5$ mm, N=52. In other words, a large number of the sound receivers are required.

Conventional technical features are that the interval between the sound receivers gets narrowed, and the number of the sound receiver must be increased so that the accuracy of the water level measurement is enhanced But, the disadvantages are as follows:

The increasing of the number n of the sound receiver causes the water level meter to become complex and thus results in heightening the failure possibility of the sound receiver. For example, the sound receivers are positioned below or over the water surface according to the water level change. If the water level is raised, the sound receiver disposed on the lowest portion of the system is under a larger water pressure. Against this situation, the sound receivers are thoroughly waterproofed and their receiving sensitivities must be kept at a uniform state in air as well as in water. And, the sound receivers must be made into a compact size free of the failure. Due to these reasons, the sound receiver gets complex and expensive. It is found out from much experience that the failure ratio of the sound receiver is highest among parts of the system.

A next problem exists in being not able to narrow the interval l between the sound receivers, auxiliary. The reason is as follows: In order to secure the higher water level measuring range, a sonic pulse of a lower frequency is used. As shown in FIG. 2, it takes much time $$\tau = \frac{6}{1000} = 6 \times 10^{-3} s$$

until the sonic pulse is fully attenuated. In FIG. 2, a dotted line is a reflected pulse. If f=1000 Hz, the reflected pulse requires 6 periods for the fully attenuation, in which the period.

A transit time $t_{\Delta L}$ that the sonic pulse is reflected on the water surface and transited to the sound receiver closest to the water surface is as follows:

$$t_{\Delta L} = \frac{2\Delta L}{C_{\Delta L}}$$

In order to get the sound receiver to receive an incident wave and then reflected wave, exactly, $t_{\Delta L} \geq \tau$. If $C_{\Delta L}$=348 m/s, ΔL is as follows:

$$\Delta L = \frac{\tau \cdot C_{\Delta L}}{2} = \frac{6 \cdot 10^{-3} \cdot 348}{2} = 1.04 \text{ m}$$

It means that l can't be selected below 1.04 m. In order to select a small value of l, the frequency of the sonic pulse must become larger. As the frequency of the sonic pulse is increased, the damping becomes larger. For it, the water level measurement can't be secured in a larger range. The water level measurement range is usually 50 m.

The patent discloses that l is selected to be 0.78 m in order to secure the water level measuring error ΔL=±1 cm, but if the frequency f of the sonic pulse is equal to 1000 Hz, it is not possible to measure the water level. Even though l is selected to be 1.04 m, the corresponding sound receiver is switched into another sound receiver to be operated thereover, when the water level ΔL rises a little. As a result, if l is selected to be larger than 1.04 m, the water level measuring error is increased. It is now used to be l≈2 m for the manufacturing of the system.

The conventional technology has limitations in securing the accuracy of the water level measurement. Also, the accuracy of the water level measurement can't be secured, even though the number of the sound receiver is increased and l is decreased.

Accordingly, an object of the invention is to provide a sonic water level measuring method for securing the higher accuracy in a wider water level measuring range with a number of sound receivers being not used and system therefor.

SUMMARY OF THE INVENTION

A sonic water level measuring method and system therefor comprises two sound generator mounted toward the water surface on the upper of a wave-guide tube, which are spaced away at an interval $l_1$ from each other; a float submerged in water and including a projector integrally extended therefrom with a diameter of 0.5 times as large as that of the wave-guide tube, the upper surface of which is kept at a height of $l_2$; and a sound receiver receiving incident waves upon the generating of a sonic pulse and then sonic waves reflected in order on the upper surface of the projector and the water.

Therefore, a sonic water level measuring method comprises steps of measuring a sonic pulse transit time $t_L$ from a moment that a first sound receiver receives an accident wave until the first sound receiver receives a wave reflected on the water surface, measuring times $t_1$ and $t_2$ that the sonic pulse is transited in an interval $l_1$ between two sound receivers and in an interval $l_2$ between the upper surface of the projector and the water surface and measuring a water level based on the measured values as follows:

$$L = \left(\frac{t_L}{2}\right) \cdot \frac{1}{2}\left(\frac{l_1}{t_1} + \frac{2l_2}{t_2}\right) \tag{6}$$

Wherein, two sound receivers disposed on the upper of the wave-guide tube is always mounted to be in air, and the projector integrated with the float is called "Sound Reflecting Cylinder" below.

BRIEF DESCRIPTION OF THE DRAWINGS

The invention will be described in detail with reference to the accompanying drawings, in which.

DETAILED DESCRIPTION OF THE INVENTION

According to the invention, a sonic water level measuring method now will be explained in detail with reference to FIGS. 3 and 4.

Figure 3:
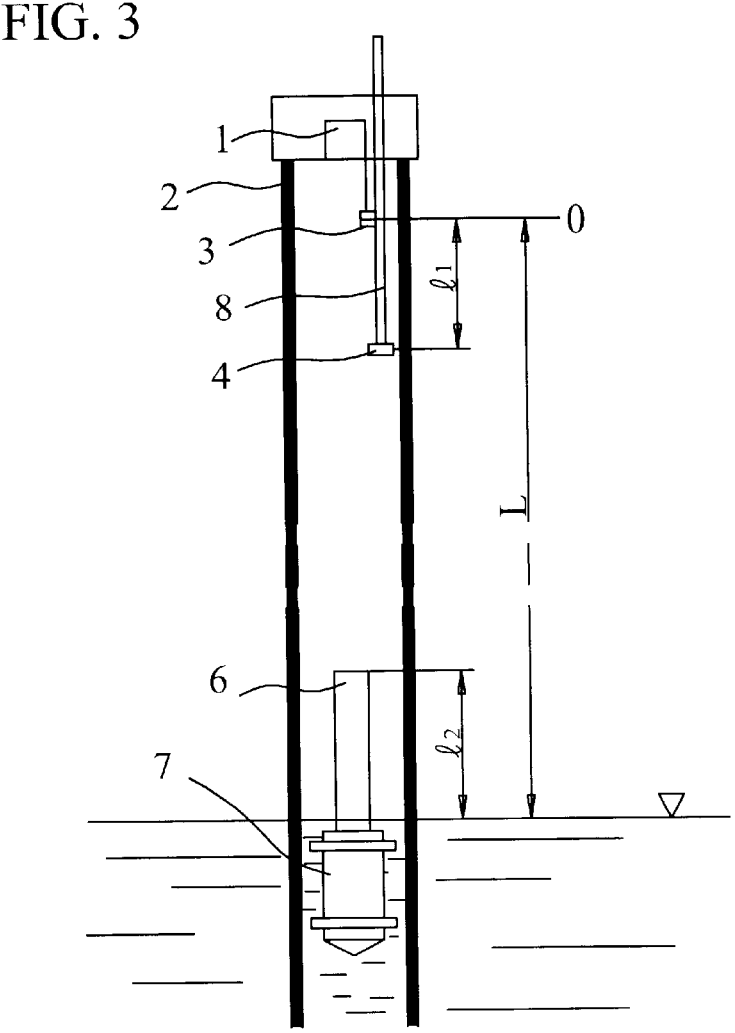
FIG. 3 is a view illustrating a sonic water level measuring method according to the invention.
Figure 4:
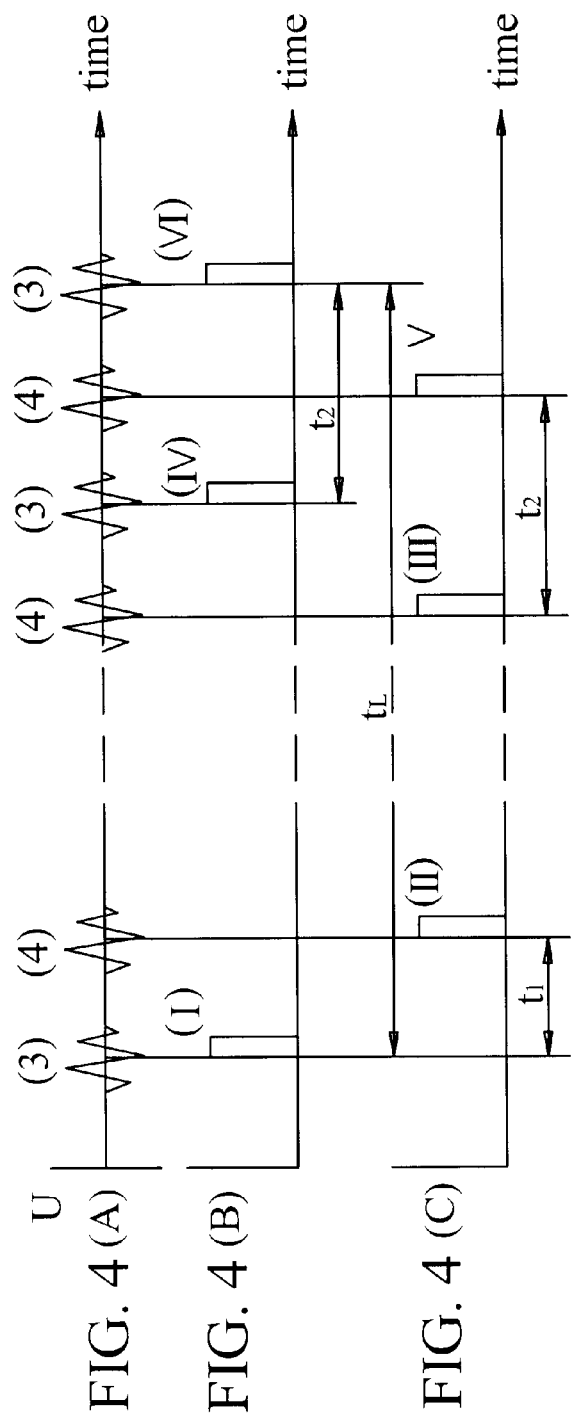
FIGS. 4A–4C are views illustrating wave shapes generated upon the receiving time of the sonic pulse according to the invention.

FIG. 3 shows a part of a sonic water level measuring system for performing a sonic water level measuring method according to the invention.

1 is a sound generator, 2 is a wave-guide tube, 3 and 4 are sound receivers (called "microphone" below), 6 is a hollow sound reflecting cylinder and 7 is a float integrated with the hollow sound reflecting cylinder 6. 8 is a microphone rod for mounting the microphone 4 on its front end to adjust an interval $l_1$ between the microphone 3 and 4. $l_2$ not explained is an interval between the upper surface of the sound reflecting cylinder 6 and the water surface.

The position of the microphone 3 is subject to be an original point of the water level measurement. Assuming that the original point has a height $H_0$ above sea level, a water level H of a reservoir or open sluice is as follows:

$$H = H_0 - L$$

L is a distance from the position of the microphone 3 to the water surface. The distance L is measured using a sonic wave as follows:

The sound generator 1 generates sonic pulses. The sonic pulse is transited toward the water surface along the wave-guide tube 2, which is defined into an incident wave. The incident wave is first reflected on the upper surface of the sound-reflecting cylinder 6 and on the water surface in order, and then transited upward along the wave-guide tube, which is called "reflected wave". At that time, the microphones 3 and 4 receive the incident waves in order, and then the reflected waves on the upper surface of the reflecting rod 6 and the water surface reach in an order of the microphones 4 and 3.

FIG. 4A shows wave shapes of the outputting signals that the microphones 3 and 4 generate in times, and FIGS. 4B and 4C show wave shapes of a single pulse signal in times to catch moments that the outputting signals of the microphone 3 and 4 are amplified and then a zero crossing circuit generates a zero potential signal at one period of the amplified signals. (3) and (4) shown in FIG. 4A are the outputting signal of each of the microphone 3 and 4. (I), (II), (III) . . . (VI) shown in FIGS. 4B and 4C are a sequence number of a pulse in times that the outputting signals of the microphone 3 and 4 are caught. A time interval between pulses (I) and (II) or pulses (V) and (VI) is a time ti that it takes for the sonic pulse to transit the interval $l_1$ between the microphones 3 and 4. A time interval between pulses (IV) and (VI) or pulses (III) and (V) is a time $t_2$ that it takes for the sonic pulse to transit a distance two times as long as an interval $l_2$ between the upper surface of the sound reflecting cylinder 6 and the water surface. A time interval between pulses (I) and (V) is a time $t_L$ that it takes for the sonic pulse to transit to and from a distance L between the microphone 3 and the water surface.

For example, $$t_1 = \frac{l_1}{C_2} \tag{7}$$

$$t_2 = \frac{2l_2}{C_2} \tag{8}$$

$$t_L = \frac{2L}{C_L} \tag{9}$$

Wherein, $C_1$, $C_2$ and $C_L$ are a sound velocity of interval $l_1$, $l_2$ and L.

On the other hand, the microphone 3 can be omitted. Instead of it, a bottom surface of the sound generator 1 is used as a reflecting surface, or the sound generator 1 can be used as a sound receiver. In that case, a moment that an electric signal is applied to the sound generator to be operated is considered as an original measuring point. In that time, a delay time occurs due to an electronic circuit property, which is added to the outcome of the transit time measurement. Therefore, the delay time must be found out in advance and deleted from the measuring result. But, if the delay time is not constant, a measuring error of the sonic pulse transit time occurs. On the contrary, using the microphones 3 and 4 is free from the influence over the delay time.

As $l_1$ and $l_2$ each is the interval exactly measured in advance, the sound velocities $C_1$ and $C_2$ is measured as follows:

$$C_1 = \frac{l_1}{t_1}; C_2 = \frac{2l_2}{t_2} \tag{10}$$

But, the sound velocity $C_L$ in the interval L cannot be measured, directly, because the interval L is a parameter changed according to the changing of the water level. It is assumed that the sound velocity $C_L$ is as follows:

$$C'_L = \frac{1}{2}(C_1 + C_2) = \frac{1}{2}\left(\frac{l_1}{t_1} + \frac{2l_2}{t_2}\right) \tag{11}$$

Of course, a sound velocity $C'_L$ obtained by the expression (11) may not be corresponded to the sound velocity $C_L$ in the interval L. as the sound velocity $C'_L$ is calculated, a distance L' between the position of the microphone 3 and the water surface is as follows:

$$L' = \frac{t_L C'_L}{2} = \frac{t_L}{2} \times \frac{1}{2}\left(\frac{l_1}{t_1} + \frac{2l_2}{t_2}\right) \tag{12}$$

Therefore, an error of the distance L' is as follows:

$$\delta_L = \frac{L'}{L} - 1 = \frac{C'_L}{C_L} - 1 \tag{13}$$

Wherein, $$L = \frac{t_L}{2} C_L$$

Figure 5:
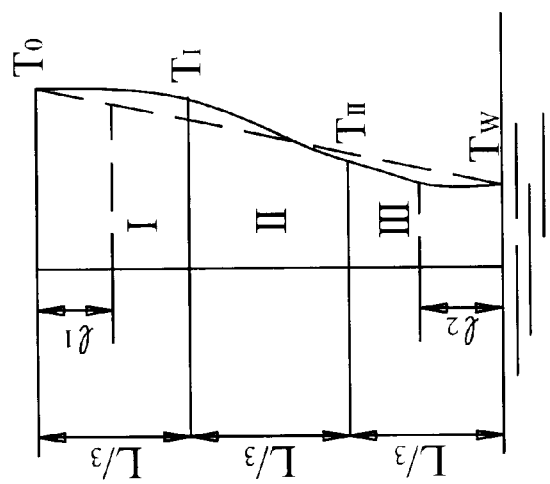
FIG. 5 is a view illustrating a distribution of an air temperature in a wave-guide tube.

Multiplying the expression (13) by 100 represents a relative error $\delta_L$. The relative error $\delta_L$ is analyzed as follows:

In case that the relative error is analyzed even in the prior arts such as the patents as mentioned above, it is assumed that the air temperature in the wave-guide tube is changed in a linear as shown in FIG. 5. Under the condition, the relative error $\delta_L$ is analyzed as follows:

Considering that $T_0$ and $T_2$ each is an air temperature in the position of the microphones 3 and 4, $T_W$ is a temperature of the water surface and $T_3$ is a temperature on the reflecting surface of the sound reflecting cylinder 6, average temperatures $T_{l1}$, $T_{l2}$ and $T_L$ in each of the interval $l_1$, $l_2$ and L are calculated as follows:

$$T_{l_1} = \frac{T_0 + T_2}{2} = \frac{T_0 + T_0 - \frac{\Delta T}{L}l_1}{2} = T_0 - \frac{\Delta T}{2L}l_1 \tag{14}$$

$$T_{l_2} = \frac{T_w + T_w + \frac{\Delta T}{L}l_2}{2} = T_w + \frac{\Delta T}{2L}l_2 \tag{15}$$

$$T_L = \frac{T_0 + T_w}{2} \tag{16}$$

Wherein, $\Delta T = T_0 - T_W$

An expression between the sound velocity and the air temperature related to the average temperature is as follows:

$$C = C_0 + 0.6\tau° C. \tag{17}$$

$C_1$, $C_2$ and $C_L$ are obtained by being substituted into the expression (17), wherein $C_0 = 331.6$ m/s when $T=0°$ C., and a ratio of $C'_L$ and $C_L$ is obtained as follows:

$$\frac{C'_L}{C_L} = \frac{\frac{1}{2}(C_1 + C_2)}{C_L} = \frac{0.5 \cdot C_0 \left[1 + \beta\left(T_0 - \frac{\Delta T}{2L} l_1\right) + 1 + T_L + \beta\left(T_w + \frac{\Delta T}{2L} l_2\right)\right]}{C_0 \left[1 + \beta\left(\frac{T_0 + T_w}{2}\right)\right]}$$

$$\text{Wherein, } \beta = \frac{\alpha}{C_0} = 1.81 \times 10^{-3}$$

As a result, $$\frac{C'_L}{C_L}$$

is follows:

$$\frac{C'_L}{C_L} = \frac{1 + 0.5\beta\left[T_0 + T_w + \frac{\Delta T}{2L}(l_2 - l_1)\right]}{1 + 0.5\beta(T_0 + T_w)}$$

Accordingly, the relative error $\delta_L$ is as follows:

$$\delta_{L'} = \frac{1 + 0.5\beta\left[T_0 + T_w + \frac{\Delta T}{2L}(l_2 - l_1)\right]}{1 + 0.5\beta(T_0 + T_w)} - 1 \quad (18)$$

In the expression (18), assuming that $l_1 = l_2 = l$, $\delta_{L'} = 0$.

Like this, in case that $l_1 = l_2 = l$ in the wave-guide tube similar to that of a prior art, $\delta_L = 0$.

Herein, it is noted that the invention requires only two microphones 3 and 4 operated in air unlike the convention system including a number of microphones submerged in water and positioned in air and significantly reduces the water level measuring error according to the change of the sound velocity in the wave-guide tube. The reasons are as follows:

If the air temperature at the upper of the wave-guide tube is higher than that at the lower of the wave-guide tube, the expression (11) is calculated as follows:

$$C'_L = \frac{1}{2}(C_1 + C_2) = \frac{1}{2}(C_L + \Delta C_1 + C_L - \Delta C_2) = C_L + \frac{\Delta C_1 - \Delta C_2}{2} \quad (19)$$

Where, $C_L$ is a sound velocity in the interval L. If $\Delta C_1 = \Delta C_2$, $C'_L = C_L$. On the contrary, if the air temperature at the upper of the wave-guide tube is lower than that at the lower of the wave-guide tube, $C'_L$ is calculated as follows:

$$C'_L = \frac{1}{2}(C_L - \Delta C_1 + C_L + \Delta C_2) = C_L + \frac{\Delta C_2 - \Delta C_1}{2}$$

($\Delta C_1 - \Delta C_2$) or ($\Delta C_2 - \Delta C_1$) is always smaller than $\Delta C_1$ or $\Delta C_2$, one half of which is a measuring error of the sound velocity $C_L$ in the interval L.

But, under the condition of $l_1 = l_2 = l$, the case of $\Delta C_1 = \Delta C_2$ never occurs. Therefore, $\delta_L$ cannot be equal to 0. The cause is as follows:

The average temperature $T_L$ in the interval L can be calculated based on the expression (16). Because the temperature distribution curve does not appear to be a perfect linear, but can be represented as a linear distribution corresponded to the average temperature in the interval L. Nevertheless, the temperature distribution state in the upper of the wave-guide tube on which the microphones 3 and 4 are mounted, for example the temperature distribution state in the interval $l_1$ does not correspond to that nearby the water surface that the sound reflecting cylinder is mounted in, for example the interval $l_2$.

For example, when an ambient air temperature is higher than a water temperature in summer, the hot air in the wave-guide tube rises upward, so the temperature difference between the microphones 3 and 4 is relatively greater. In other words, in the interval $l_1$, the gradient degree of the temperature changing is higher. But, the wave-guide tube is "cooled" by the water near the water surface, the gradient degree of the temperature changing in the interval $l_2$ is less over the upper of the wave-guide tube.

On the contrary, if the ambient air temperature is too far lower than the water one, the gradient degree of the temperature changing in the interval $l_2$ becomes larger than that on the upper of the wave-guide tube. The temperature distribution state dividing the interval L into three is illustrated in FIG. 6.

Figure 6:
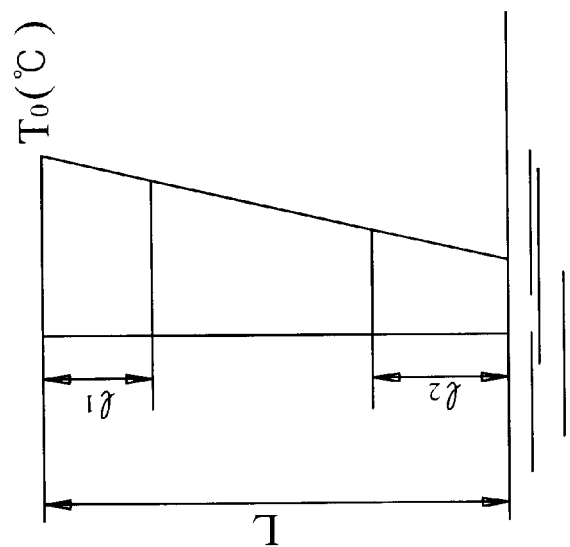
FIG. 6 is a view illustrating a distribution of an air temperature in a wave-guide tube.

Referring to FIG. 6, the dotted line is a straight line showing an average temperature gradient degree from a temperature $T_0$ at the mounting position of the microphone 3 to a one $T_W$ at the water surface. The average temperature gradient is as follows:

$$\tan\alpha = \frac{T_0 - T_w}{L}$$

The temperature changing gradients in the intervals I and II are as follows:

$$\frac{3(T_0 - T_{I1})}{L} = \frac{3}{L}\Delta T_I; \quad \frac{3(T_{II} - T_w)}{L} = \frac{3}{L}\Delta T_{III}$$

Therefore, the average temperatures $T_{l1}$, $T_{l2}$ and the sound velocities $C_1$, $C_2$ in the intervals $l_1$ and $l_2$ are as follows:

$$T_{l_1} = \frac{1}{2}\left(T_0 + T_0 - \frac{3}{L}\Delta T_I \cdot l_1\right) = T_0 - \frac{3}{2L}\Delta T_I \cdot l_1$$

$$T_{l_2} = \frac{1}{2}\left(T_w + T_w + \frac{3}{L}\Delta T_{III} \cdot l_2\right) = T_w + \frac{3}{2L}\Delta T_{III} \cdot l_2$$

Accordingly, $$C_1 = C_0\left[1 + \beta\left(T_0 - \frac{3}{2L}\Delta T_I \cdot l_2\right)\right] \quad (20)$$

$$C_2 = C_0\left[1 + \beta\left(T_w + \frac{3}{2L}\Delta T_{III} \cdot l_2\right)\right] \quad (21)$$

At that case, $C'_L$ is as follows:

$$C'_L = \frac{1}{2}(C_1 + C_2) = C_0\left\{1 + 0.5\beta\left[T_0 + T_w + \frac{3}{2L}(\Delta T_{III} l_2 - \Delta T_I \cdot l_1)\right]\right\} \quad (22)$$

The substitution of the expression (22) into the expression (13) of the relative error $\delta_L$ is as follows $$\delta_L = \frac{C'_L}{C_L} - 1 = \frac{1 + 0.5\beta\left[T_0 + T_w + \frac{3}{2L}(\Delta T_{III} l_2 - \Delta T_I \cdot l_1)\right]}{1 + 0.5\beta(T_0 + T_w)} - 1 \quad (23)$$

In the expression (23), the establishment of $\delta_L \to 0$ must meet the condition as follows:

$$\Delta T_{III} l_2 = \Delta T_I l_1 \quad (24)$$

$$\frac{l_1}{l_2} = \frac{\Delta T_{III}}{\Delta T_I} \quad (25)$$

Accordingly, if the relationship of the expression (25) is secured by adjusting the intervals $l_1$ and $l_2$ according to the temperature changing differences $\Delta T_I$ and $\Delta T_{III}$ in the upper and lower of the wave-guide tube, due to the measuring error of the sound velocity $C_L$ in the interval L the water level measuring error $\delta_L \to 0$. If the relationship of the expression (25) is secured by adjusting the interval $l_2$, it is difficult to adjust the interval $l_2$ that is a length of the sound reflecting rode positioned at the lower of the wave-guide tube. For it, it is convenient to adjust the interval $l_1$ between the microphones 3 and 4 in order to meet the condition as follows:

$$l_1 = \frac{\Delta T_{III}}{\Delta T_I} \cdot l_2 \quad (26)$$

In order to obtain the interval $l_1$ by the expression (26), it is not necessary to measure the temperature changing differences $\Delta T_I$ and $\Delta T_{III}$. The interval $l_1$ is adjusted as follows; under the worst condition, for example the condition that $T_0$ is the greatest and $T_W$ is the lowest, for example $T_0$ is 40° C. and $T_W$ is 22° C., the interval L between the microphone 3 and the water surface is accurately measured using a precision rule, and the interval $l_1$ is adjusted so that L=L' through the comparison of the value L' measured by the sonic water level measuring system with the interval L. On the contrary, under the condition that the ambient air temperature is too far lower than the water one, for example $T_0$ is −10° C. and $T_W \approx 0$° C., the interval $l_1$ is adjusted so that L=L'.

Therefore if the interval $l_1$ is adjusted when $|T_0-T_W|$ becomes the greatest, the measuring error of the interval L is reduced unless $|T_0-T_W|$ exceeds the greatest absolute value. In order to keep up with this situation, the sonic water level measuring system is preferably corrected a few times in a year, for example every seasonal variation. The correction is performed when the water level is required to be very precisely measured. If the water level measuring allowance error $\Delta_L \approx \pm 10$ mm, it is no matter to keep at $l_1=l_2=$const. In that case, the expression (23) is calculated as follows:

$$\delta_L = \frac{1 + 0.5\beta\left[T_0 + T_W + \frac{3l}{2L}(\Delta T_{III} - \Delta T_I)\right]}{1 + 0.5\beta(T_0 + T_W)} \quad (27)$$

Table 1 presents an absolute value of the relative error $\delta_L$ followed by the changing of absolute values of $$\frac{l}{L}$$

and $\Delta T_{III} - \Delta T_I$.

TABLE 1

$\delta_L = f(\Delta T_i; l/L)\%$

| $|\Delta T_{m}-\Delta T_{I}|$ ° C. | l/L | | | | |
|---|---|---|---|---|---|
| | 0.01 | 0.02 | 0.04 | 0.06 | 0.1 |
| 2.0 | 2.57·10⁻³ | 5.14·10⁻³ | 1.02·10⁻³ | 1.54·10⁻³ | 2.57·10⁻³ |
| 4.0 | 5.14·10⁻³ | 9.60·10⁻³ | 2.05·10⁻³ | 3.08·10⁻³ | 5.14·10⁻³ |
| 6.0 | 7.71·10⁻³ | 1.54·10⁻³ | 3.08·10⁻³ | 4.62·10⁻³ | 7.71·10⁻³ |

On the other hand, there seldom happens the situation of $|\Delta T_{III}-\Delta T_I|=4$° C. in site that the sonic water level measuring system is mounted. Assuming that the temperature difference of $T_0-T_W=40$° C.−22° C.=18° C., the temperature difference of $\Delta T_{III}-\Delta T_I$ in an interval of one-third between the upper and lower of the wave-guide tube=6° C. Herein, $|\Delta T_{III}-\Delta T_I|=4$° C., when $\Delta T_I=10$° C. and $\Delta T_{III}=6$° C. If $\Delta T_I=-10$° C. and $\Delta T_{III}=2$° C. in a cold weather, the average temperature difference $T_0-T_{W=}=-8$° C., so the temperature difference in the one-third interval of L is around 2.66° C. Under this condition, $\Delta T_I$ must have been −6° C. and $\Delta T_{III}$ must have been 2° C., so that $|\Delta T_{III}-\Delta T_I|=4$° C. In other words, under the worst condition, when $|\Delta T_{III}-\Delta T_I|=4$° C., assuming that L=10 m or L=50 m and l=1 m, the absolute error $\Delta_L$ (mm) of the measurement of the interval L is calculated as follows:

When L=10 m, $$\frac{l}{L} = 0.1$$

and $\delta_L = 5.14 \cdot 10^{-2}\% = 5.14 \cdot 10^{-4}$ $\Delta_L = 10000$ mm·$5.14 \cdot 10^{-4} = 5.14$ mm When L=50 m, $$\frac{l}{L} = 0.02$$

and $\delta_L = 2.6 \cdot 10^{-3}\% = 2.6 \cdot 10^{-5}$ $\Delta_L = 50000 \cdot 2.6 \cdot 1 \cdot 10^{-5} = 1.3$ mm Herein, it is contradictory that $\Delta_L$ 1.3 mm at time that L of 50 m is smaller than $\Delta_L =$ of 5.14 mm at time that L=10 m. The reason is because it is assumed that $T_0=40$° C. and $T_W=22$° C. irrelevant to the interval L. As a matter of fact, the shorter the interval L is, the less the temperature difference of $T_0$ and $T_W$ is. $|\Delta T_{III}-\Delta T_I|$ becomes small more and more. And the experiment in site causes a larger error than the measuring error of L calculated as described above. The reason results from two causes.

First, it is assumed that the average temperature $$T_L = \frac{T_0 + T_W}{2}$$

in the expression (24), but the average temperature $$T_L = \frac{T_0 + T_W}{2} \pm \Delta_T$$

in fact according to the season, in which $\Delta_T$ is an error under the assumption that the air temperature in the wave-guide tube is changed in a constant linear gradient. $\Delta_T$ is usually subject to be smaller and doesn't exceed 1° C.

Nevertheless, when L=50 m, $$\frac{l}{L} = 0.02$$

and $|\Delta T_{III} - \Delta T_I| = 4°$ C., $\delta_L$ is as follows:

$$\delta_L = 1.02 \cdot 10^{-4} > 9.6 \cdot = 10^{-5} = 0.96 \cdot 10^{-4}$$

That is, the error is increased a little.

Secondary cause is because the measuring errors of the sonic pulse transit time $t_1$, $t_2$ and $t_L$ are added, because of it, the water level measuring error can be effectively compensated. The compensating method is as follows:

In a place such as a room where the temperature difference scarcely exists, for example $T_0 \approx T_W$, the wave-guide tube of the sonic water level measuring system is mounted, and the water temperature $T_W$ in the lower of the wave-guide tube is subject to a room temperature. In that case, the measuring error of the sound velocity $C_L$ doesn't occur because $C_1 = C_2 = C_L$. $T_0 = 40°$ C. and $T_W = 22°$ C. Only the measuring error of the interval L occurs due to the sonic pulse transit time measuring error.

Therefore the interval $l_1$ is adjusted to compensate for the water level measuring error due to the sonic pulse transit time measuring error, so that $\Delta_L$ becomes small.

The length $l_2$ of the sound reflecting rod is selected as follows: it must be discriminated between the sonic pulses reflected on the sound reflecting rod and on the water surface without disturbing with respect to each other. The time interval $t_2$ between the two sonic pulses is as follows:

$$t_2 = \frac{2l_2}{C_2} \quad (28)$$

Figure 1:
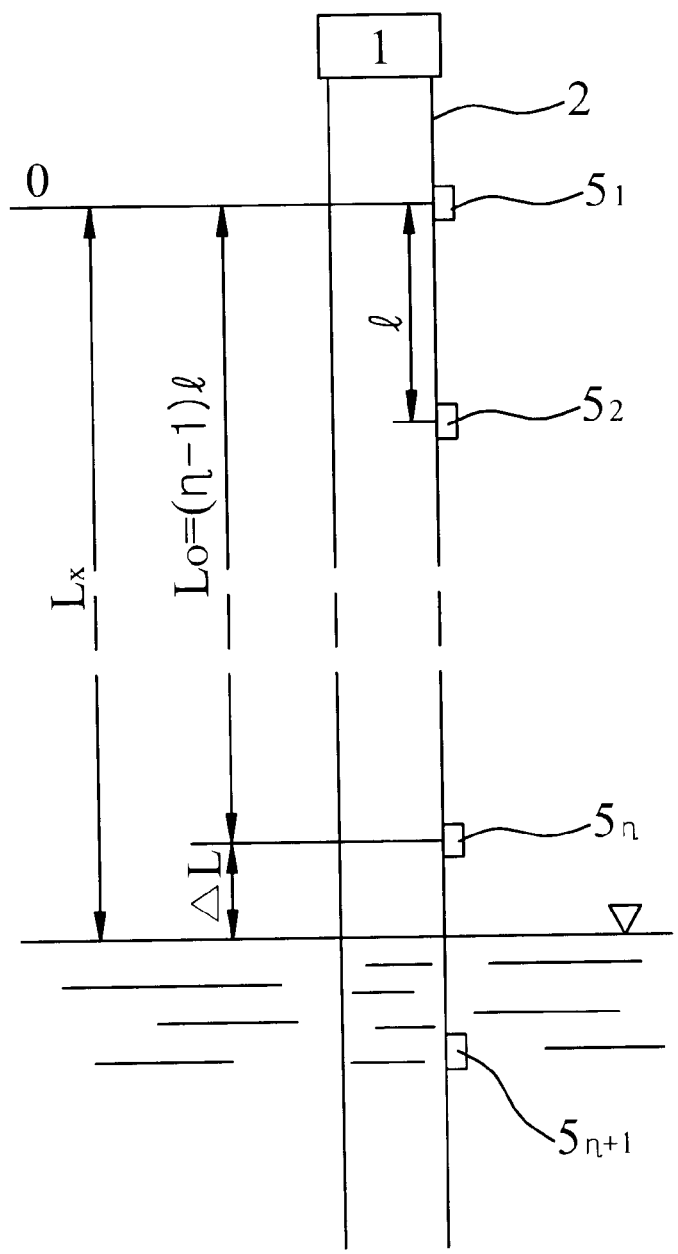
FIG. 1 is a view illustrating a sonic water level measuring method.
Figure 2:
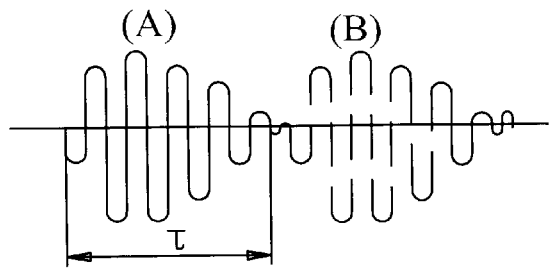
FIG. 2 is a view illustrating a wave shape of a sonic pulse.

But, referring to FIG. 2, the time interval until the sonic pulse is completely damped is as follows:

$$\tau = \frac{N}{f} \quad (29)$$

Wherein, N is the number of period until the sonic pulse is completely damped, and f is a frequency of the sonic pulse.

Therefore $t_2$ is as follows:

$$t_2 = \frac{2l_2}{C_2} \geq \frac{N}{f}$$

For example if N=5 and f=1000 Hz, $t_2 \geq 5 \cdot 10^{-3}$ S. If the maximum sound velocity $C_2 = 350$ m/s in the interval $l_2$, $l_2$ is as follows:

$$l_2 \geq \frac{N \cdot C_2}{2f} = \frac{5 \cdot 350}{2 \cdot 1000} = 0.875 \text{ m}$$

Therefore $l_2$ is selected to be around 1 m. But, if the interval $l_1$ between the microphones 3 and 4 is selected to be equal to $l_2$, the outputting signals of the microphones 3 and 4 are overlapped. The reason is because $$t_1 = \frac{l_1}{C_1}.$$

The following expressions are established.

$$t_1 = \frac{l_1}{C_1} \geq \frac{N}{f};$$

$$l_1 \geq \frac{NG}{f} = \frac{5 \cdot 350}{1000} = 1.75 \text{ m} > l_2$$

In order that $l_1 \approx l_2$, the outputting signals of the microphones 3 and 4 must be inputted to their corresponding amplifiers, not one amplifier, to be respectively amplified.

A sonic water level measuring system for realizing the sonic water level measuring method according to the invention will be described below.

Figure 7:
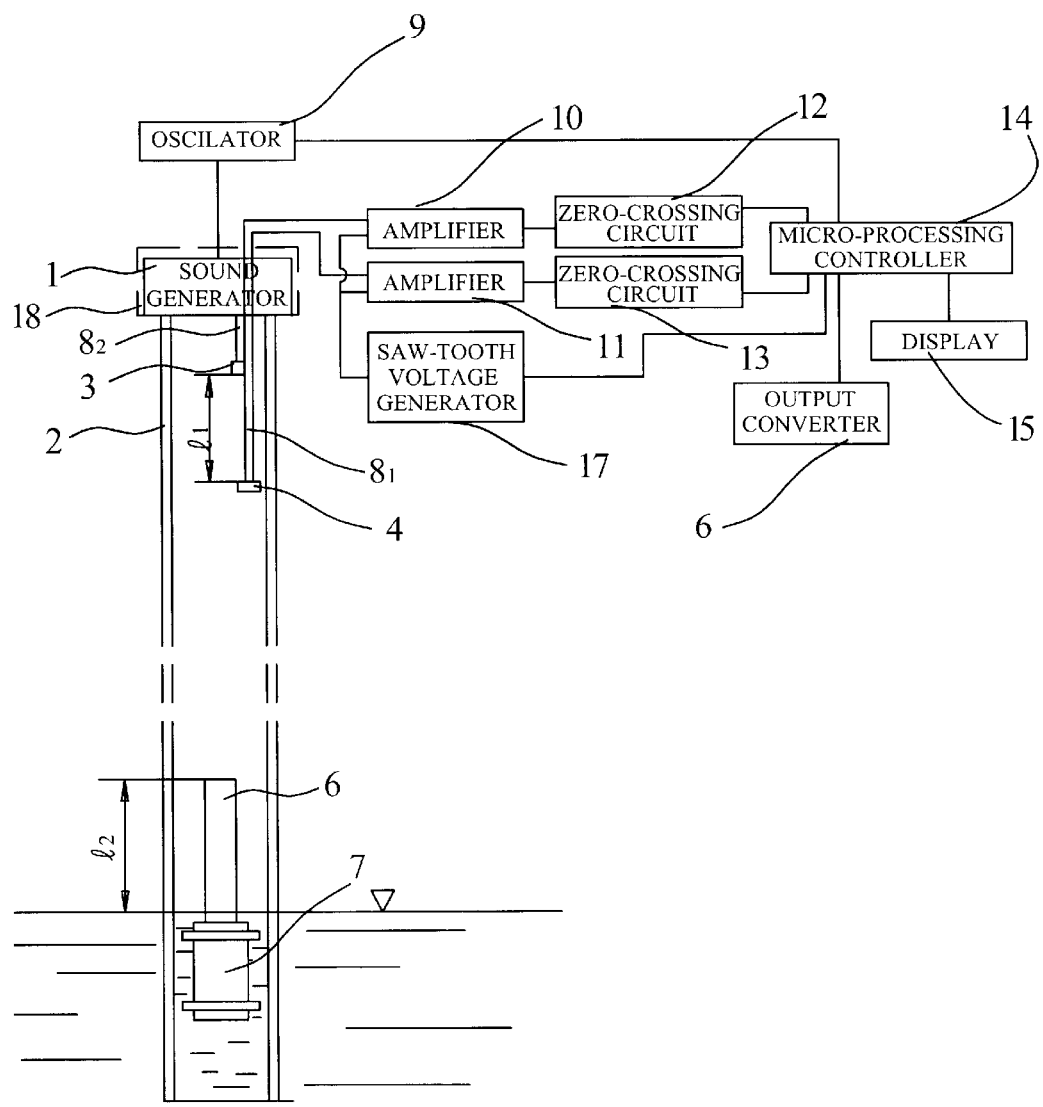
FIG. 7 is a block diagram illustrating a sonic water level measuring system according to the invention.

Referring to FIG. 7, 1 is a sound generator, 2 is a wave-guide tube 3 and 4 are a microphone 6 is a sound reflecting cylinder, 7 is a float, 8₁ and 8₂ are a microphone rod for mounting the microphones 3 and 4 thereon and 18 is a case for protecting the sound generator 1.

On the other hand, an electronic circuit is constituted as follow: 9 is an oscillator for operating the sound generator 1. 10 and 11 are amplifiers for amplifying the outputting signals of the microphones 3 and 4. 12 and 13 are zero-crossing circuits for catching a moment that the outputting signals of the microphones 3 and 4 pass through the zero potential at time of ending its first period and for generating a single pulse. 14 is a microprocessor, 15 is a display, 16 is an outputting signal converter and 17 is a saw-tooth pulse generator.

The saw-tooth generator 17 is controlled by the microprocessor 14 to begin to be operated from a moment that the sound generator 1 generates sonic pulses and then to be stopped at the moment of receiving sixth pulse amplified through the amplifiers 10 and 11. The microphone 3 is fixed to the microphone rod 8₂ on the position spaced in over an approximate inner diameter D of the wave-guide tube 2 from the bottom surface of the case 18, where a planar wave is shaped. Under the condition that the air temperature in the upper of the wave-guide tube 2 is higher, it is preferable to pull down the microphone 3 a lot. The microphone 4 is fixed to the lower end of the microphone rod 8₁, in which the microphone rod 8₁ is extended passing through the case 18. The microphone rods 8₁ and 8₂ are in the form of a tube through which a cable is passed.

The interval $l_1$ between the microphones 3 and 4 is adjusted by moving the microphone rod 8₁. The float 7 and the sound-reflecting cylinder 6 are connected to each other. The interval $l_2$ between the upper surface of the sound reflecting cylinder 6 and the water surface is set by the expression (20).

The wave-guide tube 2 is made of PVC, SUS, Metal Pipe etc. according to the mounting condition and the length thereof, its inner diameter D being selected to be smaller than a wave length of the sonic pulse so that the transit condition of the planar wave is secured.

The sonic water level measuring system is operated as follows:

The oscillator 9 is operated at a constant period according to the programming inputted into the microprocessor 14. The sound generator 1 receives the outputting signals of the oscillator 9 to generate sonic pulses. The sonic pulses are transited along the wave-guide tube 2 toward the water surface. At that time the microphones 3 and 4 receive incident waves in order. The incident waves are reflected on the sound-reflecting rod 6 and the water surface and then transited toward the upper of the wave-guide tube 2. The microphones 3 and 4 again receive the reflected waves in order contrary to the receiving of the incident wave.

The microphones 3 and 4 are respectively connected to the amplifiers 10 and 11 to amplify the outputting signals thereof. The zero crossing circuits 12 and 13 are connected to the amplifiers 12 and 13, respectively, to form a single pulse as shown in FIGS. 4B and 4C, when the amplified signals reaches a zero potential at the falling edge every period. The microprocessor 14 receives the outputting signals from the zero-crossing circuits 12 and 13 to measure transit times of $t_1$, $t_2$ and $t_L$ and compute the distance L from the position of the microphone 3 to the water surface based on the expression (12).

The display 15 represents the result of computing the distance L by the microprocessor 14. The converter 16 is connected to the microprocessor 14 to convert the outputting signals from the microprocessor 14 into a signal such as a code signal of RS232C having the outputting of 4~20 mA that are necessary for a telemeter, an automatic water level recorder, etc.

Figure 8:
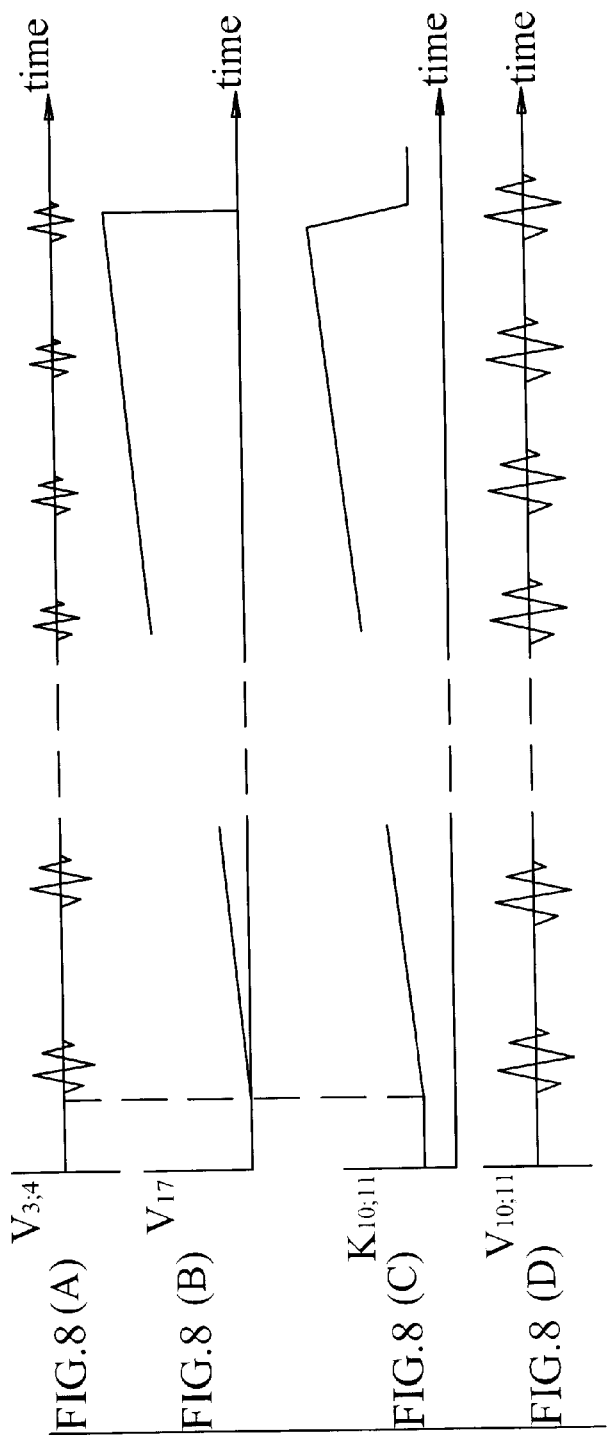
FIGS. 8A to 8D are views illustrating wave shapes obtained by adjusting an amplitude of an output signal upon the receiving of an accident wave and a reflecting wave according to the invention.

When the sonic incident wave is transited toward the microphones 3 and 4, the sound pressure is relatively larger, and the outputting voltages of the microphone 3 and 4 are relatively higher. But, when the signals on the sound reflecting cylinder 6 and the water surface reaches the microphones 3 and 4, their sound pressure gets smaller considerably, and the outputting voltages of the microphones 3 and 4 becomes less and less. Due to it, the amplifiers 10 and 11 are controlled to output the same voltage independent of the receiving voltage of the incident wave or the reflected wave in order to operate the zero-crossing circuits 12 and 13, normally. To it, the saw-tooth pulse generator 17 adjusts the amplification factor of the amplifiers 10 and 11 as shown in FIG. 8.

FIG. 8A shows the outputting voltage $V_{3;4}$ of the microphones 3 and 4, FIG. 8B shows the outputting voltage $V_{17}$ of the saw-tooth pulse generator 17, FIG. 8C shows the change of a amplification factor $K_{10;11}$ of the amplifiers 10 and 12 and FIG. 8D shows the outputting voltage $V_{10;11}$ of the amplifiers 10 and 11. Herein, the amplifiers 10 and 11 permits their amplification factors to be adjusted by the voltage applied thereto.

The saw-tooth pulse generator 17 begins being operated by a signal that the microprocessor 14 operates the oscillator 9 and is subject to being stopped at a moment that the zero-crossing circuits 12 and 13 outputs the sixth pulse.

For example if L=20 m and $C_L$=350 m/s, the operating time $t_L$ of the saw-tooth pulse generator 17 is as follows:

$$t_L=2L/C_L=40/350=0.114s.$$

Figure 9:
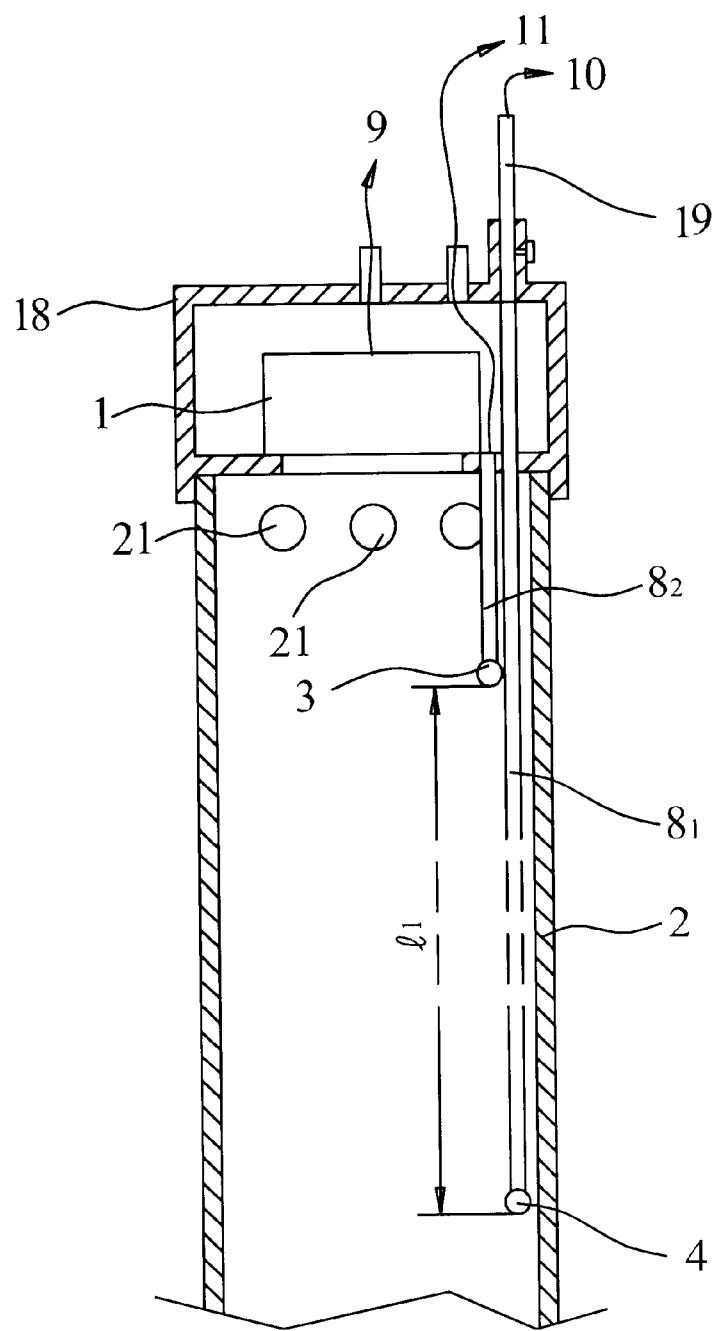
FIG. 9 is a view illustrating the mounting of a microphone constituted as a sonic water level measuring system according to the invention.

FIG. 9 shows the mounting of the microphones 3 and 4. The microphone 3 is mounted below the bottom surface of the case 8 by means of the microphone rod $8_2$. The microphone 4 is fixed to the lower end of the microphone rod $8_1$. The microphone rod $8_1$ is extended passing through the case 18 and has a scale thereon. A plurality of holes are perforated adjacent the upper end of the wave-guide tube 2 to discharge hot air therefrom outside in summer. The interval $l_1$ between the microphones 3 and 4 is adjusted and fixed by moving the microphone rod $8_1$. In FIG. 9, arrow lines represent a cable each of which is connected to the amplifiers 10 and 11.

Figure 10:
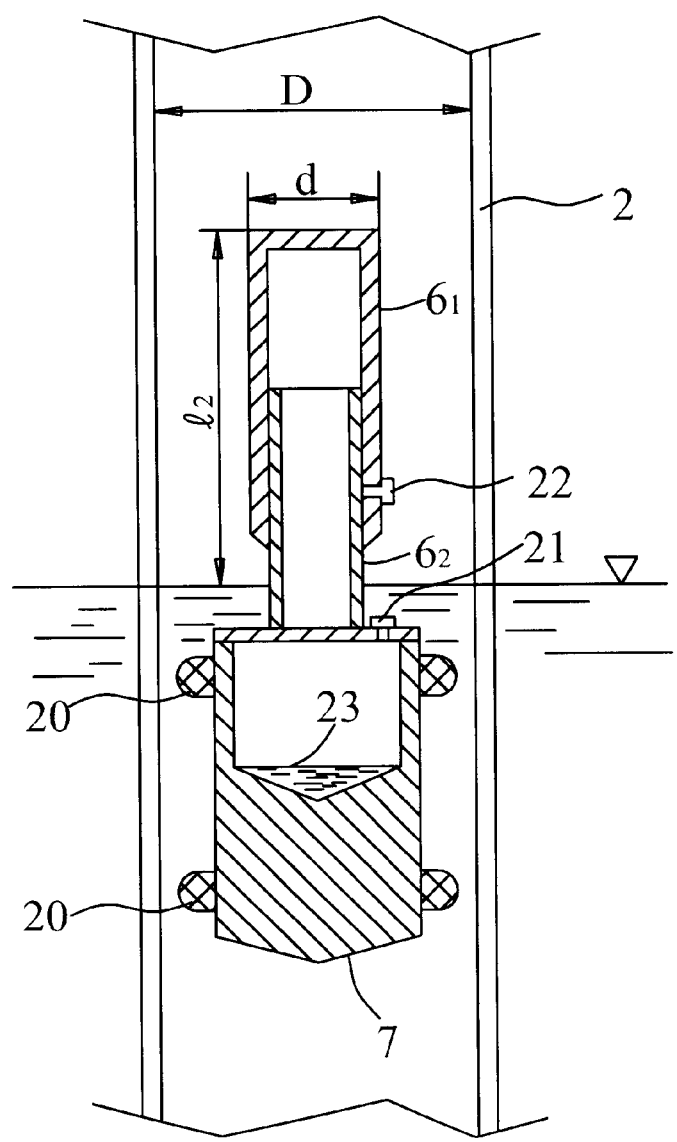
FIG. 10 is a view illustrating the configuration of a float according to the invention.

Referring to FIG. 10, the float 7 is integrated with the sound-reflecting cylinder $6_1$. The sound-reflecting cylinder 6 includes two cylinders $6_1$ and $6_2$. The cylinder $6_1$ is closed at the upper end, and the cylinder $6_2$ is fitted into the cylinder $6_1$. The cylinder $6_1$ is configured to adjust the interval $l_2$ between the upper surface thereof and the water surface. The float 7 has a weight portion at the lower and a closed space at the upper to adjust a buoyant force. It is preferable to submerge the float 7 in the water by 1 cm. In order to adjust the depth to be submerged, the float 7 is provided with a valve 21 to supply distilled water thereinto. The float 7 also includes at least one ring 20 having a semicircle section. The ring 20 rocks and/or swings the float 7 upon the going up and down of the float 7 according to the water level changing. Therefore the ring 20 limits the rocking amplitude and permits the float 7 to be freely moved up and down. For it, the ring 20 is subject to minimize the friction with the inner wall of the wave-guide tube 2. The ring 20 is made of Teflon, etc. that has a lower friction coefficient and the rustproof property. More preferably, the float 7 is made of Fluoric-plastic containing Fluorine for preventing the propagation of water bacteria. The inner diameter of the ring 20 is made to be smaller than that of the wave-guide tube 2 by 3%. If the wave-guide tube 2 is mounted on a slant for measuring the water level, the water level H is measured in a manner to calculate a height h from an original water level measuring point to the water surface using an expression h=L×sin α, in which a is a gradient angle. The water level H=$H_0$−h, wherein $H_0$ is a height above sea level of the original water level measuring point, and the upper surface of the float 7 is projected above the water surface with its buoyant force being adjusted.

Figure 11:
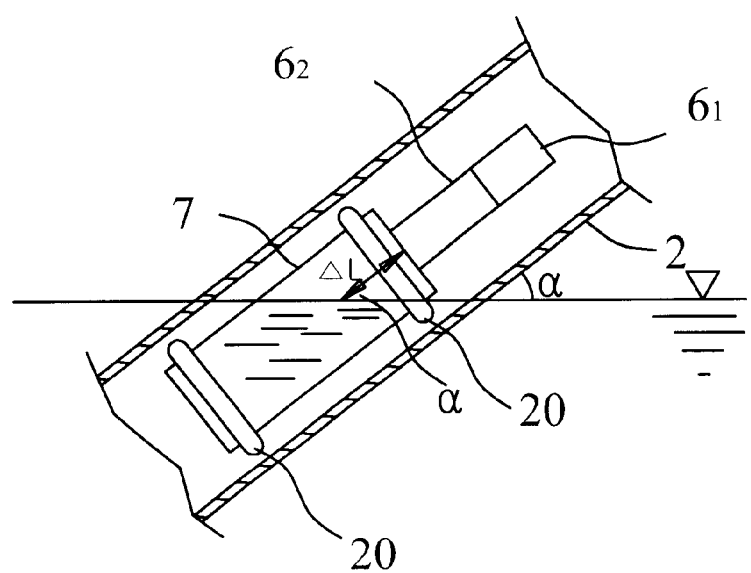
FIG. 11 is a view illustrating the operating position of the float according to the invention, if the wave-guide tube is mounted on the slant.

FIG. 11 shows a state that the float 7 is floated over the water surface. At that time the interval ΔL that is not measured by the sonic wave is as follows:

$$\Delta L = \frac{D}{2}\tan\alpha = const$$

Wherein, D is an inner diameter of the wave-guide tube 2.

Therefore the height h=(L+ΔL)sin α.

The diameter d of the sound-reflecting cylinder 6 is selected as follows: based on the experiment, when the length $l_2$ of the sound-reflecting cylinder 6 is around 1 m, if the ratio of an area $S_d$ of the reflecting surface and an area $S_W$ of the water surface is secured to be 1:3, the intensities of the reflecting waves are similar to each another.

$$d = \frac{D}{\sqrt{4}} \approx 0.5D$$

is selected, wherein D is an inner diameter of the wave-guide tube.

$$\left(\frac{S_W}{S_d} = \frac{(D^2 - d^2)}{d^2} = \frac{D^2}{d^2} - 1 = 3, \therefore d = \frac{D}{\sqrt{4}} = 0.5D\right)$$

In that case the float 7 is floated on the water, the submerging state of the float 7 and the length $l_2$ of the sound-reflecting cylinder 6 are adjusted and then the float 7 is thrown into the wave-guide tube 2.

According to the invention, the sonic water level measuring system is too much simple over the conventional water level meter, needs not a number of sound receivers and secure the high accuracy of the water level measurement independent of the changing of the ambient weather condition. Furthermore if it is intended to measure the water level, more accurately, the interval $l_1$ is simply adjusted according to a seasonal variation.

What is claimed is:

1. A sonic water level measuring method for fixing an original measuring point on the upper of a wave-guide tube in the form of a pipe measuring times that it takes for a sonic pulse to be transited through air medium in a wave-guide tube toward a water surface and transited back to an original measuring point after being reflected on the water surface and computing a distance from the original measuring point to the water surface comprising steps of:
    arranging two microphones constituted as a sound receiver to be spaced away in an interval $l_1$ from each other below a sonic pulse generator on the upper of the wave-guide tube;
    securing an interval $l_2$ between the water surface and the reflecting surface of a sound-reflecting cylinder with a float integrated with a sound reflecting cylinder being submerged in the water;
    measuring times $t_1$, $t_2$ and $t_L$ that it takes for the sonic pulse to transit the intervals $l_1$ and $l_2$ and to go up and down a distance L from a first microphone to the water surface, respectively;
    calculating the distance L from the first microphone to the water surface as follows:

$$L = \frac{t_L}{2} \cdot \frac{1}{2}\left(\frac{l_1}{t_1} + \frac{2l_2}{t_2}\right) = \frac{1}{4}t_L \cdot \left(\frac{l_1}{t_1} + \frac{2l_2}{t_2}\right)$$

Only, $l_2$ is selected as follows:

$$l_2 \geq \frac{NC_2}{2f}$$

wherein, f is a sonic pulse frequency, N is the number of period until the sonic pulse is completely damped and $C_2$ is a maximum sound velocity that can be expected in the interval $l_2$.

2. The sonic water level measuring method as claimed in claim 1, in which:
    the interval $l_1$ between the two microphones is adjusted to minimize the water level error as follows:

$$l_1 = l_2 \frac{\Delta T_{III}}{\Delta T_I}$$

wherein, $\Delta T_I = T_0 - T_I$ and $\Delta T_{III} = T_{II} - T_W$, $T_0$ and $T_W$ are an air temperature near the microphone disposed at the original measuring point of L on the upper of the wave-guide tube and a temperature of the water surface and $T_I$ and $T_{II}$ are air temperatures on the upper and lower of L in the wave-guide tube.

3. The sonic water level measuring method as claimed in claim 1, in which:
    if $|\Delta T_{III} - \Delta T_I| < 6°$ C. and a water level measuring allowance error $\Delta_L \approx \pm 10$ mm, the water level is computed using $l_1 = l_2 = l =$ const independent of a water level measuring range.

4. A sonic water level measuring system including a sound generator, a wave-guide tube a sound receiver mounted in the wave-guide tube an amplifier and a microprocessor comprising:
    a first microphone mounted in the wave-guide tube to be spaced away in an interval more than an inner diameter of the wave-guide tube from the sound generator mounted on the upper of the wave-guide tube;
    a second microphone mounted on the lower end of a microphone rod which is movable up and down to secure an interval $l_1$ downward along the wave-guide tube from the first microphone;
    a float floating in water and integrated with a sound-reflecting cylinder which is extended by the interval $l_2$ from the water surface in the wave-guide tube;
    a sound generator electrically connected to an oscillator for operating it;
    two amplifiers connected to each of the first and second microphones;
    two zero-crossing circuits connected to each of the outputs of the two amplifiers; and,
    the microprocessors connected to the outputs of the two zero-crossing circuits;
    a saw-tooth generator connected to the two amplifiers to increase the amplification factor thereof, which is controlled by the microprocessor to be operated at a moment that the sonic pulse is generated and stopped at a moment that the zero-crossing circuit generates $6^{th}$ pulse;
    wherein the microprocessor has a system programming previously inputted thereinto to operate the oscillator at a constant period, memorizes the intervals $l_1$ and $l_2$ at a memory, measures times that it takes for the sonic pulse to transit the intervals $l_1$ and $l_2$ and to go up and down a distance L from the first microphone to the water surface respectively, and computes the value of the distance L, and if the wave-guide tube is vertically mounted, the upper surface of the float is submerged in water by 1 cm, and if the wave-guide tube is slantingly mounted, the upper surface of the float is projected above the water surface with its buoyant force being adjusted.

5. The sonic water level measuring system as claimed in claim 4, in which:
    a diameter d of the reflecting surface of the sound-reflecting cylinder is selected to be a half of the inner diameter D of the wave-guide tube the float includes a ring having a semicircle section and the outer diameter of the ring is smaller than the inner diameter D of the wave-guide tube by 3%.

6. The sonic water level measuring system as claimed in claim 1, in which:
    the water level measuring system further comprises a correcting method including steps of
    mounting the sonic water level measuring system in a room that a temperature difference between the upper and lower of the wave-guide tube scarcely exists;
    measuring the distance L from the original water level measuring point to the water surface by a precise length measuring means; and, adjusting the interval $l_1$ between the two microphones to correspond a value of L' measured by a sonic water level meter to the value of L in order to compensate for the water level measuring error that occurs according to a sonic pulse transit time measuring error.

7. The sonic water level measuring method as claimed in claim 2, in which:

if $|\Delta T_{III} - \Delta T_I| < 6°$ C. and a water level measuring allowance error $\Delta_L \approx \pm 10$ mm, the water level is computed using $l_1 = l_2 = l = \text{const}$ independent of a water level measuring range.

8. The sonic water level measuring system as claimed in claim 4, in which the water measuring system further comprises a correcting method including steps of:

mounting the sonic water level measuring system in a room that a temperature difference between the upper and lower of the wave-guide tube scarcely exists;

measuring the distance L from the original water level measuring point to the water surface by a precise length measuring means; and, adjusting the interval $l_1$ between the two microphones to correspond to a value of L' measured by a sonic water level meter to the value of L in order to compensate for the water level measuring error that occurs according to a sonic pulse transit time measuring error.

* * * * *